Sept. 22, 1959

L. MONELLI 2,905,098

HIGH-EFFICIENCY PUMP, MORE PARTICULARLY FOR
REMOTE HYDRAULIC POWER TRANSMISSIONS

Filed May 28, 1957

United States Patent Office 2,905,098
Patented Sept. 22, 1959

2,905,098

HIGH-EFFICIENCY PUMP, MORE PARTICULARLY FOR REMOTE HYDRAULIC POWER TRANSMISSIONS

Lorenzo Monelli, Fermo, Italy

Application May 28, 1957, Serial No. 662,234
Claims priority, application Italy May 30, 1956

4 Claims. (Cl. 103—157)

Remote hydraulic power transmissions and motors are generally known and their usefulness is appreciated. It is further known that satisfactory operation thereof largely depends upon the provision of pumps supplying pressure liquid with a small power consumption even with a high operating pressure, the pump being of low weight and cost.

Where operation is effected by hand, it is essential for the pump to maintain a satisfactory efficiency even at low speed; certain uses necessitate the pump delivery to be constantly correlated with the displacement or rotation, respectively, of the movable pump member according to a pre-fixed algebraic or trigonometric function.

A large number of pumps have been designed and employed to this end, which are in part unsuitable for high pressures or low speed (gear pumps) or are unsatisfactory in efficiency (lobe pumps or Root's pumps) or are heavy and expensive such as pumps equipped with rotary cylinders in parallel or star arrangement.

A purpose of this invention is to combine in a pump the various valuable properties required for satisfactory operation of a remote power transmission and provide a device which is extremely simple, tough, of light weight, easy to manufacture and assemble, hence highly advantageous from an economic point of view.

The device can be realized in the following three ways:

(a) fixed displacement and absorbed torque variable sinusoidally in accordance with the angle of rotation, (b) variable displacement and absorbed torque variable sinusoidally in accordance with the angle of rotation, (c) fixed displacement and absorbed torque variable according to any desired law depending upon the angle of rotation, more particularly of constant absorbed torque.

The pump can be built by the use of diamagnetic materials, which is particularly useful for some uses, specially for marine plants.

The improved pump comprises a shaft receiving motion from an available source of power and acts at the same time as a double-acting piston and valve member by rotating and sliding at the same time in a cylinder acting as pump casing. Considering its structure and performance said shaft will be referred to hereafter as piston-shaft.

The piston-shaft includes three axially adjacent and aligned sections:

(a) a cylindrical smooth section which receives motion from the source of power and is supported by a plain bearing;

(b) an intermediate cylindrical section which is larger in diameter than the previous one and is arranged for rotation and sliding with a tight fit in a cylinder matching it in diameter;

(c) a further cylindrical section which equals in diameter the firstmentioned section and has ports bored therein for valving purposes.

The pump casing is accordingly formed internally with three aligned cylinders matching in diameter the three sections of the piston-shaft, of such length as to allow of rotation and axial displacement of the piston-shaft.

A first cylinder is a usual plain bearing as mentioned above; the second cylinder is operatively associated with the intermediate section of the piston-shaft, and the third cylinder is a bush in which two diametrically opposite holes are bored connecting with the pump delivery and suction sides. On rotation and displacement of the piston-shaft said holes come into register with the ports bored in the said third section of the piston-shaft and which connect with two annular chambers confined by the piston-shaft and pump casing.

A device is located in the middle portion of the pump casing to cause the piston-shaft to perform axial displacements which are a predetermined function of the angle through which the piston-shaft rotates.

Where a displacement of the piston-shaft is required which varies in a sinusoidal manner as a function of the rotational angle of the piston-shaft, the device comprises a shoe or other equivalent member carried along in rotation by the shaft and sliding on a plane inclined to the rotational axis. Where the inclination of said plane is constant, a fixed displacement pump results, while if the inclination of the plane can be varied at will a variable displacement pump results.

Where the axial displacement of the piston-shaft is required to comply with any desired law, a groove is cut in the intermediate section of the piston-shaft, the profile of which is adapted to meet the desired law. So, for instance, where a displacement which is linearly proportional to rotation is desired, the groove comprises two branches of a helicoid the pitch of which is twice the pump stroke, said helicoid branches being right-handed and left-handed, respectively.

The groove receives roller or other equivalent device mounted on a pin fixed to the pump casing.

Summarising, the pump comprises three main components:

(1) The rotatable and axially displaceable piston-shaft,
(2) The pump casing
(3) The shaft reciprocating device of the shoe, roller or equivalent type.

The result is an extremely simple machine, which is of light weight and inexpensive manufacture, affording deliveries which are any desired function of the rotation of the piston-shaft.

By virtue of its special structure the pump can easily incorporate auxiliary safety or filling valves, vents etc.

It will be seen that the pump is of highest efficiency. With regard to its volumetric efficiency it will be sufficient to consider that sealing is effected by surfaces having equal curvatures juxtaposed over a quite considerable extent, as distinct from a number of other constructions in which sealing is effected by surfaces differing in curvature which are mutually tangential only.

By virtue of the special arrangement the contact surfaces can be of any desired width, whereby any highly satisfactory efficiency can be attained with the further facility that one piston only is employed.

With regard to mechanical efficiency it should be noted that torque is directly converted to pressure by the single piston-shaft, the force bearing on the reciprocating device being the force set up by pressure on the operative piston surface and not a multiple thereof. Finally, all the sliding or rolling parts are in nearest proximity to the rotational axis or even situated therein, so that friction is minimized.

Further characteristic features and advantages of this invention will be understood from the following detailed description with reference to the accompanying drawings which show an embodiment thereof by way of example.

Figure 1:
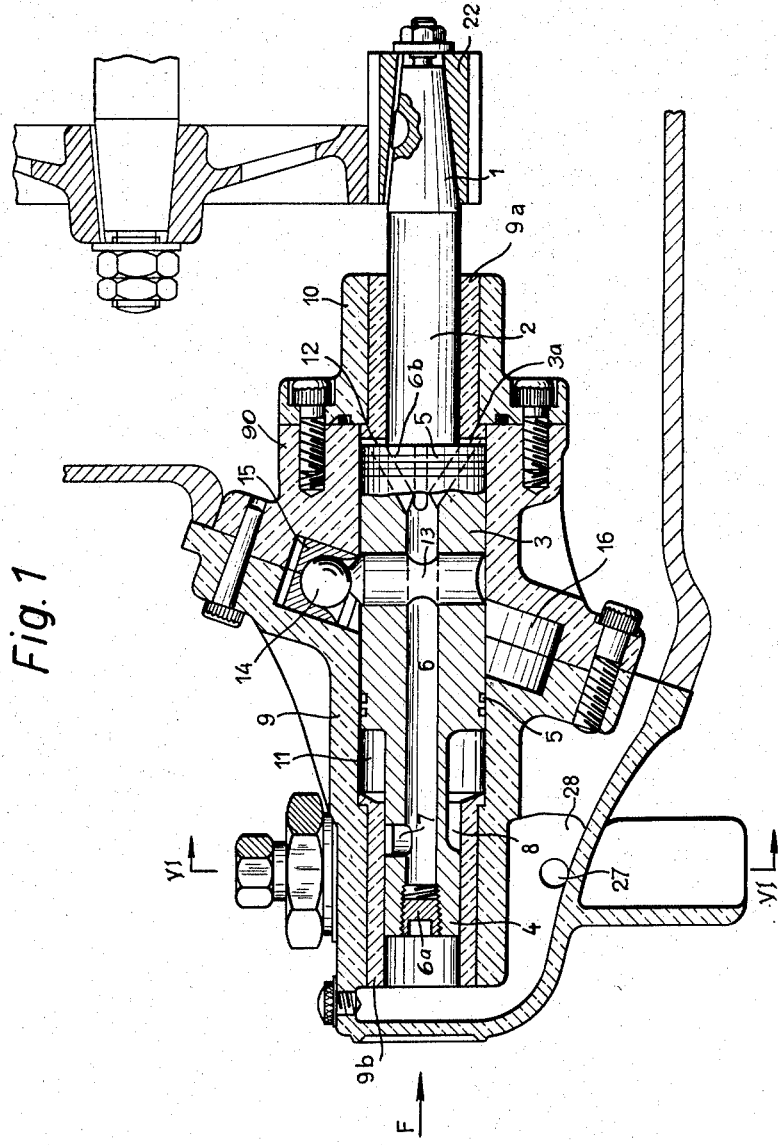
Figure 1 is an axial cross-sectional view of the pump.

In Figure 1, 1 denotes the piston-shaft comprising three integral cylindrical sections, the sections 2 and 4 of reduced diameter forming the pump shaft proper, the section 3 of larger diameter forming the piston.

The section 2 is smooth and the section 3 is formed with external peripheral grooves 5 adapted to receive split sealing rings. The sections 3 and 4 have an axial bore 6 provided therein, said bore being closed at one end by bolt 6a screwed therein and communicating at its other end with the annular shoulder 3a formed between the sections 3 and 2 of the piston shaft by means of a set of inclined channels 6b.

The cylindrical section 4 equalling in diameter the component 2 is likewise axially bored at 6, said bore opening outside the shaft by a radial port 7 bored in the section 4.

A notch 8 or equivalent longitudinal groove is cut in the section 4 diametrically opposite the port 7 and extends to the section 3.

The piston-shaft is capable of rotation and axial reciprocation within an elongated pump casing 9, which may be divided, as shown, in three parts 9, 9o and 10, respectively. The casing 9 is axially bored, two plain bronze bushings 9a, 9b being fitted into the opposite ends of the bore and acting as cylinders in which the sections 2 and 4, respectively, of the piston-shaft move and rotate with a tight fit. The piston-shaft 1 confines by its intermediate section 3 two annular chambers in the casing 9, the chamber 11 directly connecting with the notch 8, the chamber 12 connecting with the port 7 by the axial bore 6, the end of which adjacent the chamber 12 is bifurcated for fluid communication purposes.

A cross pin 13 is secured in the section 3 of the piston-shaft and engages through a ball joint 14 or equivalent device a shoe 15 within an annular groove 16 in the casing 9. The groove 16 can be inclined to the axis of the shaft 1 through a fixed angle as shown in Figure 1 or through an angle variable in any desired manner.

Figure 6:
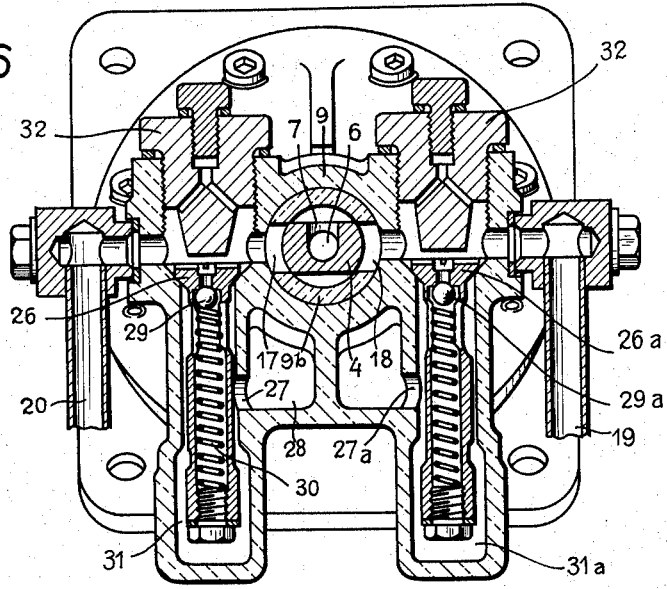
Figure 6 is a transverse cross sectional view of the pump approximately on line VI—VI of Figure 1, in which the arrangement of some auxiliary valves is visible.

It will be seen from Figure 6 that the casing 9 and bushing 9b have bored therein at the section 4 of the piston-shaft two diametrically opposite radial ports 17, 18 which on rotation and reciprocation of the piston-shaft are periodically connected to the port 7 and notch 8, hence with the chambers 11, 12.

Before further describing the pump, operation thereof will be explained as follows.

Figure 1 shows the pump in the condition in which the piston-shaft 1 is at a dead point; under these conditions the volume of the annular chamber 12 is minimized by the piston section 3 of the piston-shaft, the volume of the annular chamber 11 being largest. This condition is further shown in Figure 6, from which it will be seen that the ports 17, 18 are shut by the section 4 of the piston-shaft, no communication existing between the chambers 11, 12 and ports 17, 18.

The piston-shaft 1 is now rotated counterclockwise looking at Figure 6 (or looking in the direction of the arrow F, Figure 1). The groove 16 and shoe 15 now provide longitudinal camming means which axially displace the piston-shaft 1 to the left on Figure 1 as it rotates further. The port 7 is immediately connected with the port 17, the notch 8 connecting with the port 18. Moreover, the volume of the annular chamber 11 decreases, the volume of the chamber 12 increasing. Consequently, the fluid in the chamber 11 is forced through the notch 8 towards the port 18 and pipe 19 (which is now the delivery pipe), while the chamber 12 draws fluid from the pipe 20 through ports 17, 7 and axial conduit 6 in the piston-shaft. When the piston-shaft has rotated through 90°, the port 7 is fully connected with the port 17, the notch 8 being fully connected with the port 18. Beyond 90° rotation, the fluid is further sucked from the tube 20 and delivered into the tube 19, but communication between the ports 7 and 17 starts restricting, like the communication between the notch 8 and port 18. Just before 180° rotation is reached, the above communications are fully intercepted, as can be ascertained by imagining the section 4, Figures 1 and 6 rotated through 180° and fully displaced towards the left in Figure 1. The chamber 11 is then of minimum volume, the volume of the chamber 12 being largest.

Beyond 180° rotation the port 7 connects with the port 18, while the notch 8 connects with the port 17. At the same time the direction of axial displacement of the piston-shaft is reversed, whereby the chamber 11 starts increasing in volume, the volume of the chamber 12 decreasing. The fluid in the chamber 12 is forced into the delivery pipe 19 through ports 7 and 18, the chamber 11 drawing fluid from the pipe 20 through the port 17 and notch 18.

Assuming the piston-shaft 1 rotates in a direction contrary to the former, the pipe 20 acts as a delivery pipe, the pipe 19 acting as a suction pipe of the pump.

It will further be seen that by the action of the camming means 15, 16 as shown in Figure 1 the pump delivery follows a sinusoidal law, which further governs opening and closure of the ports 17 and 18 by the section 4. Special requirements may dictate deliveries of another nature, such as constant deliveries.

Figure 2:
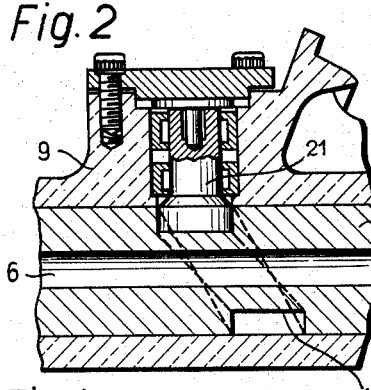
Figure 2 shows a reciprocating device for conferring to the pump particular characteristics.
Figure 3:
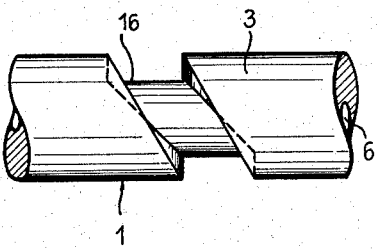
Figure 3 is a part perspective view of the grooved piston-shaft included in Fig. 2.

To this end, Figures 2 and 3, it will be sufficient to cut the groove 16 instead of in the casing in the piston-shaft and to employ instead of a ball joint 14 fast with the piston shaft a radial stud 21 rotatable about an axis which is now fixedly secured to the casing 9 and stationary.

It is understood that the law governing variation in delivery will be determined by the profile of the groove 16.

For instance, if the groove comprises two helicoid branches equal in pitch, right-handed and left-handed, respectively, as clearly visible from Figure 3, the delivery shall at any time be proportional to the rotation of the piston-shaft.

Figure 4:
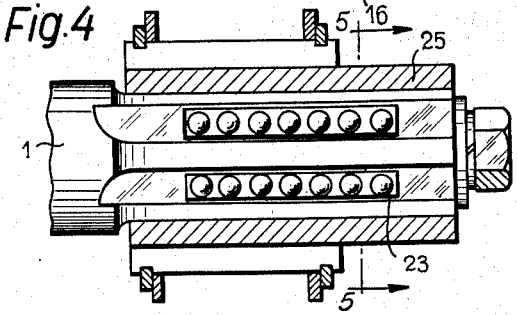
Figure 4 is an axial cross-sectional view of a joint suitable for connecting the piston-shaft to the operating member thereof.
Figure 5:
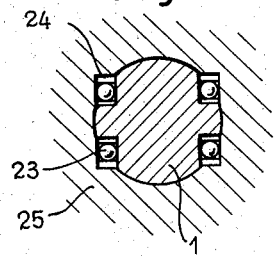
Figure 5 is a transverse cross-sectional view of the joint taken approximately on the line 5—5 in Fig. 4.

Figures 1, 4, 5 show driving arrangement which permit of axial reciprocation of the piston-shaft. Figure 1 shows at 22 an axially elongated pinion 22 keyed to the end of the shaft 1 extending from the bushing 9a. Figure 4 shows a joint embodying rolling members which transmit torque to the shaft and allow of axial displacements of the piston-shaft without any appreciable friction.

The joint is carried out by fitting into suitable grooves 24 one or more rows of balls 23 between the piston-shaft and driving member 25 equivalent to the pinion 22 in Figure 1.

The cross sectional view in Figure 6 shows at 26, 26a, two auxiliary poppet valves accommodated by recesses 31, 31a respectively, the heads of which are exposed to the fluid pressures at the ports 17, 18, respectively. The recesses 31, 31a each connect through a port 27, 27a, respectively with an auxiliary reservoir 28 and each enclose a ball relief valve 29, 29a, respectively, loaded by the springs 30. The auxiliary reservoir 28 contains a certain quantity of fluid delivered thereto for instance through valve 29a and port 27a as a result of an overpressure in the pipe 19, and which is drawn through port 27 and valve 26 in case of an excessive underpressure in the pipe 20, or vice versa, according to the direction of rotation of the piston-shaft 1.

Two plugs 32 are screwed into the pump casing over the valves 26, 26a. Upon unscrewing of said plugs the valves 26, 26a are easily removed for replacement or maintenance.

While the above described preferred embodiments of this invention have been described and illustrated, it is understood that the scope thereof is not limited to said constructions but is defined by the appended claims.

What I claim is:

1. In a pump an elongated stationary casing having a bore therethrough, said bore comprising two end sections and an intermediate section of enlarged diameter with respect to the end sections; a piston-shaft rotatable and reciprocable in the bore comprising integral end sections and an intermediate section having a fluid-tight fit in the said end sections and the intermediate section of the bore respectively, whereby two annular pumping chambers are defined in the intermediate section of the bore at opposite axial ends of the intermediate section of the piston-shaft; means for simultaneously rotating and axially reciprocating said piston shaft in said bore; a pair of diametrically opposite passages machined in one end section of the piston-shaft, said two passages constantly connecting each with one of the said annular pumping chambers respectively; and a pair of diametrically opposite ports in the end section of the bore adjacent said one end section of the piston-shaft, the ports being in full register with the said passages when the piston-shaft is in an intermediate point of its axial stroke and being intercepted by the said one end section of the piston-shaft when the latter is at its either dead point.

2. A pump according to claim 1, further comprising a pair of auxiliary reservoirs, passageways connecting said auxiliary reservoirs to said ports respectively, a check valve in each of said passageways permitting flow of fluid from said auxiliary reservoirs to said ports and a relief valve in each of said check valves to permit fluid to flow from said respective port to the auxiliary reservoir when fluid pressure at the port exceeds a selected value.

3. A pump according to claim 2, in which an opening is provided in said casing above each of said check valves, said openings having a diameter greater than that of said valves whereby said valves may be easily removed through said openings and further comprising a plug screwed in each of said openings to close the same.

4. In a pump an elongated casing, a bore in the casing comprising a pumping section of enlarged diameter and a valving section at one end of said casing; a piston-shaft rotatable and reciprocable in the bore comprising a double-acting piston section operative in the said pumping section of the bore and a valving section at its one end which is integral with said piston section and movable in a fluid tight relation within said valving section of the bore; axially operative camming interposed between the piston-shaft and casing to simultaneously rotate and reciprocate the piston-shaft in the bore; a pair of ports in said valving section of the bore; and a pair of passages in said valving section of the piston-shaft opening at opposite ends of the said piston section said last mentioned passages being provided for registering respectively with the ports when the piston-shaft is in an intermediate point of its stroke and to be intercepted by the said valving section of the piston-shaft when the latter is at its either dead point.

References Cited in the file of this patent

UNITED STATES PATENTS

| 1,276,346 | Gould | Aug. 20, 1918 |
| 1,693,024 | Drummond | Nov. 27, 1928 |
| 1,803,705 | Harner | May 5, 1931 |
| 2,222,203 | Manseau | Nov. 19, 1940 |
| 2,532,106 | Korsgren | Nov. 28, 1950 |